Figure 1:
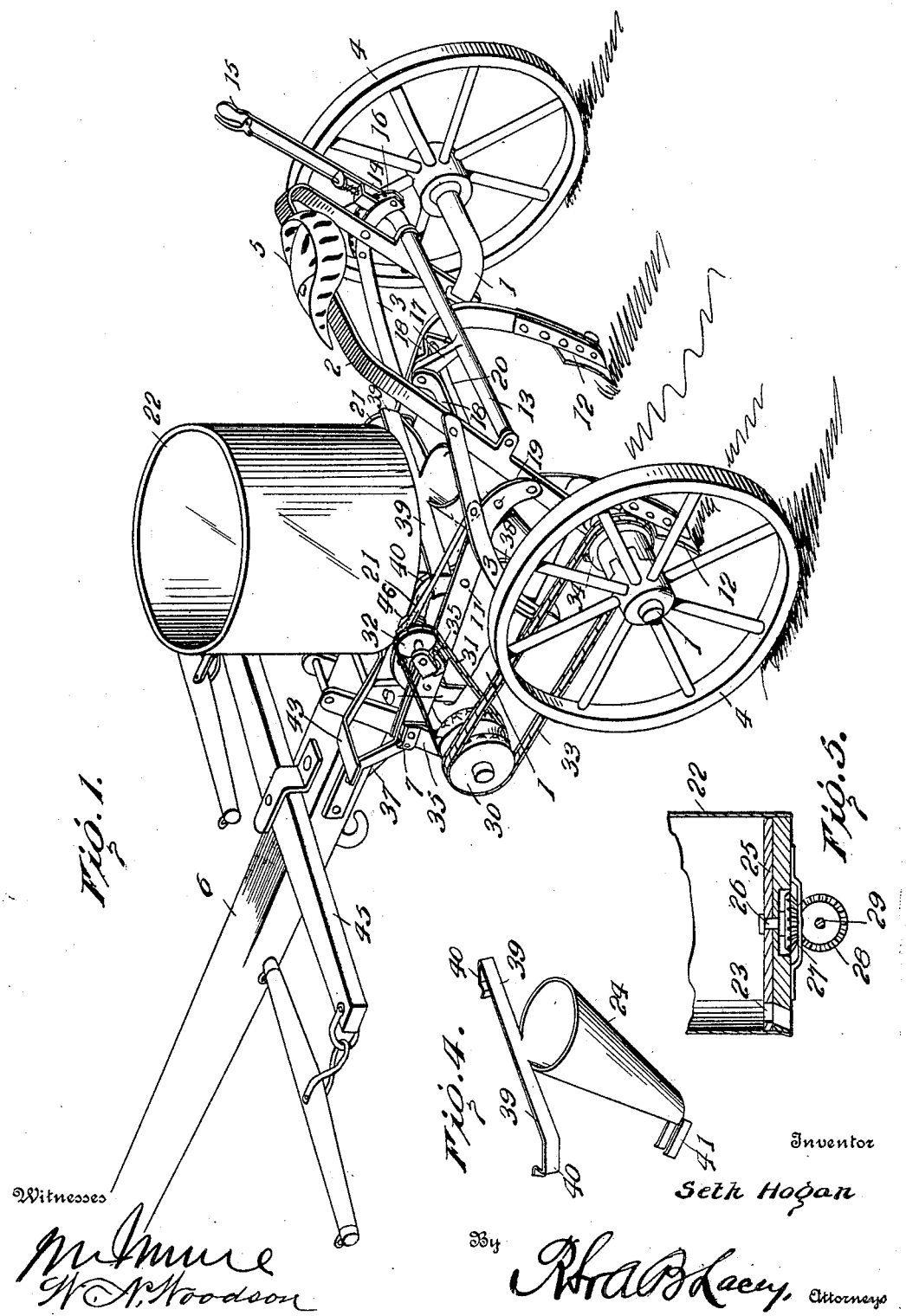

No. 830,071. PATENTED SEPT. 4, 1906.
S. HOGAN.
PLANTER.
APPLICATION FILED NOV. 7, 1905.
3 SHEETS—SHEET 2.
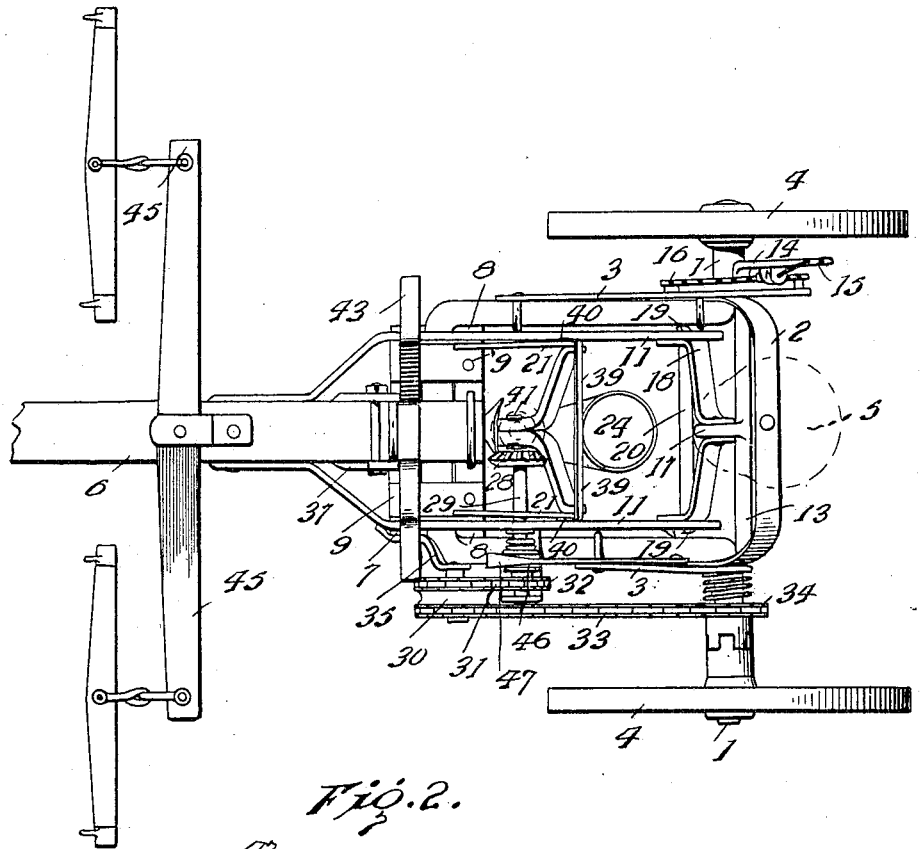
Fig. 2.
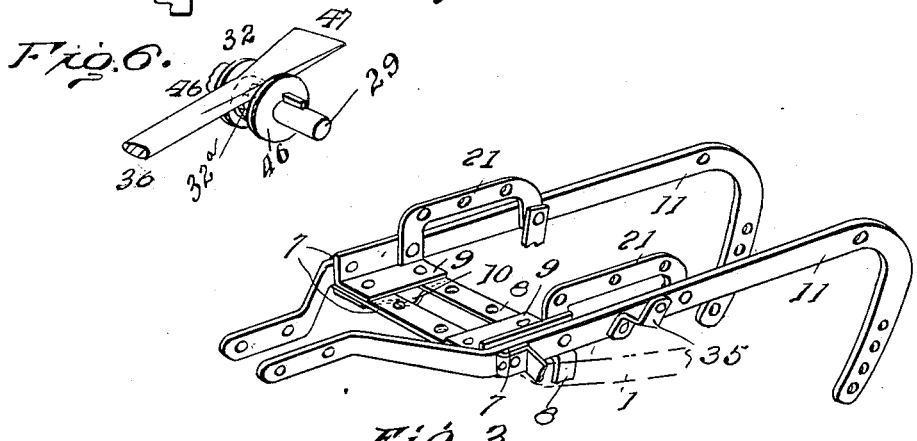
Fig. 6.
Fig. 3.
Witnesses
Inventor
Seth Hogan
By R. L. A. B. Lacey, Attorneys

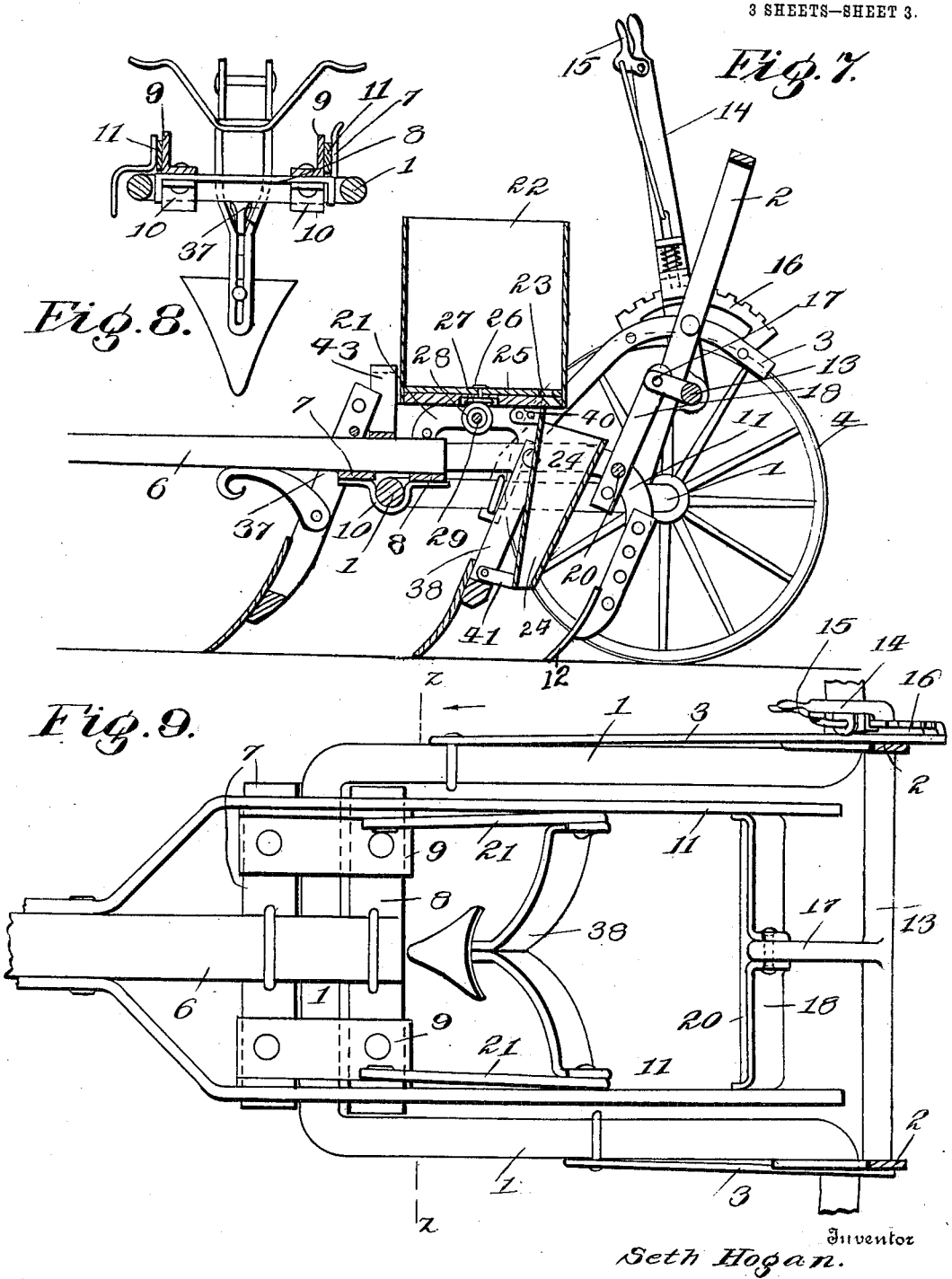

UNITED STATES PATENT OFFICE.

SETH HOGAN, OF CREEDMOOR, TEXAS.

PLANTER.

No. 830,071.  Specification of Letters Patent.  Patented Sept. 4, 1906.

Application filed November 7, 1905. Serial No. 286,263.

*To all whom it may concern:*

Be it known that I, SETH HOGAN, a citizen of the United States, residing at Creedmoor, in the county of Travis and State of Texas, have invented certain new and useful Improvements in Planters, of which the following is a specification.

This invention relates to planting machinery for dropping cotton or other seed in a furrow prepared by the machine and immediately covering the seed by the same machine which closes the said furrow by throwing earth therein.

The purpose of the invention is to devise a planter having a novel form of frame and arrangement of the operating means, whereby simplicity of construction and ease of manipulation are attained.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a planter embodying the invention. Fig. 2 is a top plan view thereof, the hopper being removed. Fig. 3 is a detail view in perspective of the draft-frame separated from the wheel-frame, the hopper being omitted. Fig. 4 is a detail perspective view of the grain-spout. Fig. 5 is a detail section of the lower portion of the hopper. Fig. 6 is a detail view in perspective of the means for throwing the seed-dropping mechanism in and out of gear. Fig. 7 is a central longitudinal section of the planter. Fig. 8 is a transverse section on the line z z of Fig. 9 looking in the direction of the arrows, showing the parts on a smaller scale. Fig. 9 is a top plan view of the crank portion of the axle, the rear end of the pole or tongue, the connections between the pole and the cross-piece of the axle-crank, the beams, the second opener, the transverse shaft supported by the arch, the latter being in section, and the connections and adjusting devices between the several parts, all being shown on a larger scale.

Corresponding and like parts are referred to in the following description and indicated in all the views of the drawings by the same reference characters.

The wheel or riding frame comprises a crank-axle 1, the crank portion having approximal horizontal arrangement and projected forward, an arch 2 secured at its lower ends to the crank-axle and extended upward, braces 3 between the side members of the arch and corresponding members of the crank portion of the axle, and ground-wheels 4, loosely mounted upon the arms of the said axle. A seat 5 is attached to the cross-piece of the arch 2. The pole or tongue 6 has pivotal connection with the cross-piece of the crank portion of the axle 1 to admit of relative vertical adjustments of the earth-opening and furrow-closing devices. The connection between said pole or tongue and the crank-axle may be had in any manner so long as a substantial structure is provided and the parts enabled to freely articulate. Cross-bars 7 and 8 are secured medially of their ends to the rear portion of the pole or tongue 6 and are spaced apart a distance to receive the transverse portion of the crank-axle, the same being mounted in bearings formed between plates 9 and 10, which are arranged above and below the cross-bars and are bolted or otherwise secured at their ends thereto. The lower plates 10 are depressed to form seats in which the transverse portion of the crank-axle is mounted. The terminal portions of the rear cross-bar 8 are bent downward to engage with the inner sides of the longitudinal bars of the axle-crank to prevent relative lateral play of said axle and the pole or tongue. The end portions of the front cross-bar 7 extend upward alongside of the beams 11, which have their rear portions curved downward and provided with covering-shovels 12. A shaft 13 is mounted in bearings attached to the side members of the arch 2 and is provided at one end with an operating-lever 14, which extends within convenient reach of the driver's seat 5 and is provided with a hand-latch 15 and the usual lock-bolt connected with said hand-latch and adapted to coöperate with a toothed bar 16, so as to hold the shaft 13 and coöperating parts in the required adjusted position.

The draft or planter frame comprises the pole or tongue 6, the beams 11, which are attached at their front ends to opposite sides of the pole and are then outwardly deflected and rearwardly extended in an approximate parallel relation and are curved downwardly to receive shovels 12 of desired pattern, according to the nature of the work. The beams 11 are rigidly attached to the outer ends of the cross-bars 7 and 8 by means of the upper plates 9 and the upwardly-bent ends of the cross-bar 7, said plates 9 being of angular formation and having their vertical wings bolted or otherwise fastened to the beams 11 and their horizontal wings firmly attached in any manner to the end portions of the cross-bars 7 and 8. The rear portions of the beams 11 are connected to an arm 17, projected forward from the shaft 13, whereby a turning of the shaft effects a relative vertical adjustment of the planter-frame and the parts supported thereby. The loose connection between the arm 17 and beams 11 consists of oppositely-disposed links 18, which have their upper ends converged and embracing opposite sides of the arm 17 and pivoted thereto and their lower ends spaced apart to lie against the inner sides of the beams 11, to which they are adjustably connected by means of pins 19, which pass through one of a series of openings formed in the lower ends of the links 18 and through corresponding openings provided in the beams 11, a spacing-sleeve 20 being mounted upon the pins 19 between the lower ends of the links 18 to hold them apart. Arched bars 21 have their side members attached to the beams 11 and support the hopper 22, adapted to receive the seed to be planted.

The planter or seeding mechanism comprises the hopper 22, which may be of any construction, actuating means for the seed-dropping mechanism and furrow opening and closing devices being provided. The hopper 22 is bolted to the arched bars 21, and its bottom is provided with a discharge-opening 23, through which the seed escapes to the spout 24. A dropping-plate 25 is arranged upon the bottom of the hopper 22, and is rotatable and is provided with one or more seed-openings to register with the discharge-opening 23. The drop-plate 25 may be of any well-known construction and is loosely mounted upon a vertical spindle 26 and is provided with a pinion 27, which is in mesh with a crown-gear 28, fast upon a transverse shaft 29, mounted in the arched bars 21 and in the portions pendent from the hopper and which is bolted to said arched bars. A twin sprocket 30 has one member connected by sprocket-chain 31 to sprocket-pinion 32, loose on shaft 29, and its other member connected by sprocket-chain 33 to a sprocket-gear 34, mounted on an arm of the crank-axle 1. The twin sprocket 30 is mounted upon a stub-axle projected outward from a bracket 35, bolted or otherwise fastened to one of the beams 11 of the planter or draft-frame. The loose sprocket-pinion 32 is provided upon its inner side with a half-clutch 3ª, which coöperates with a corresponding half-clutch 46, slidable upon and keyed to the shaft 29. The sprocket-pinion 32 when unshipped from the coöperating clutch member 46 is permitted to rotate freely without imparting any movement to the shaft 29 and the seed-dropping mechanism. A shipping-bar 36, mounted upon a convenient portion of the wheel-frame, as one of the braces 3, has one end widened or formed into a wedge 47 and arranged to come between the pinion 32 and clutch member 46 to effect separation of said parts when operating the lever 14 to throw the shovels out of the ground.

A standard 37 is adjustably connected with the pole or tongue and is provided at its lower end with a shovel of a type best adapted to the nature of the soil and the special work to be performed. The standard 37, with its shovel, constitutes a furrow or trench opener and prepares the soil for reception of the seed. In the rear of the front opener is a second opener consisting of a standard 38, provided at its lower end with a shovel arranged to track in the wake of the shovel at the lower end of the standard 37. The second opener operates immediately in advance of the grain-spout 24 and is adapted to be adjusted to operate at a slightly higher elevation than the front opener.

The spout 24 is tapered throughout its length and larger at its upper end, and is provided at said upper end with oppositely-extending arms 39, terminating in hooks 40 to embrace the rear members of the arched bars 21. Other arms 41 project forward from the lower end of the spout 24 and embrace opposite sides of the standard 38, so as to retain the lower portion of the spout in proper position. The upper and lower arms are preferably an integral part of the spout, and, like the latter, are constructed of sheet metal. Hence the arms may be readily bent to adapt them to the framework when placing the spout in position.

The pole or tongue is provided with the usual doubletree 45, having swingletrees at its end, and with a foot-rest, the latter consisting of a bar 43, attached midway of its ends to the rear portion of the pole and having its end portions bent upward and outward, the horizontal terminals being adapted to receive the feet of the driver.

Having thus described the invention, what is claimed as new is—

1. A planter comprising a crank-axle having its crank portion forwardly extended, a pole mounted upon the crank portion of said axle to admit of relative articulation therewith, beams rigidly attached at their front ends to said pole and having their rear portions curved downward and provided with shovels, and adjusting means between said beams and the crank-axle.

2. A planter comprising a crank-axle having its crank portion forwardly extended, a pole mounted upon the crank portion of said axle to admit of relative articulation therewith, beams rigidly attached at their front ends to said pole and having their rear portions curved downward and provided with shovels, an arch rigidly connected with the crank and axle and projected upward and provided with a seat, a shaft mounted upon said arch, means for turning said shaft and holding it in an adjusted position, and connecting means between said shaft and the aforesaid beams to effect relative adjustment between the crank-axle and said beams.

3. A planter comprising a crank-axle having its crank portion forwardly extended, a pole mounted upon the crank portion of said axle to admit of relative articulation therewith, beams rigidly attached at their front ends to said pole and having their rear portions curved downward and provided with shovels, an arch rigidly connected with the crank-axle and provided at its upper end with a seat, a shaft mounted upon said arch and having an arm extended therefrom, means for turning said shaft and holding it in an adjusted position, a pin connecting the said beams, links having loose connection with the end portions of said pin and having their upper ends converged and secured upon opposite sides of the arm projected from the aforesaid shaft, and means mounted upon said pin for holding the links apart and against the inner sides of the said beams.

4. In combination, a pole, spaced cross-bars at the inner end of said pole and firmly attached thereto, a crank-axle having its crank portion secured to said cross-bars and articulating therewith, beams having rigid connection with the end portions of said cross-bars and provided with shovels, and means adjustably connecting said beams with the crank-axle and securing the parts in an adjusted position.

5. In combination, a pole, spaced cross-bars secured to said pole, the terminal portions of one cross-bar projecting downward and the terminal portions of the other cross-bar extending upward, a crank-axle articulating with said cross-bars and prevented from lateral displacement by the pendent terminal portions of one of said cross-bars, beams having connection with the upward terminal extensions to one of the aforesaid cross-bars and provided with shovels, and connecting means between said beams and crank-axle to admit of relative adjustment of said parts and to secure the same in an adjusted position.

In testimony whereof I affix my signature in presence of two witnesses.

SETH HOGAN. [L. S.]

Witnesses:
 OTTO SCHRIBER,
 WILLIE HOGAN.